Sept. 25, 1928.  
G. A. RICHTER  
1,685,754  
METHOD OF RECOVERING SULPHUR DIOXIDE FROM WASTE GASES  
Filed July 14, 1923
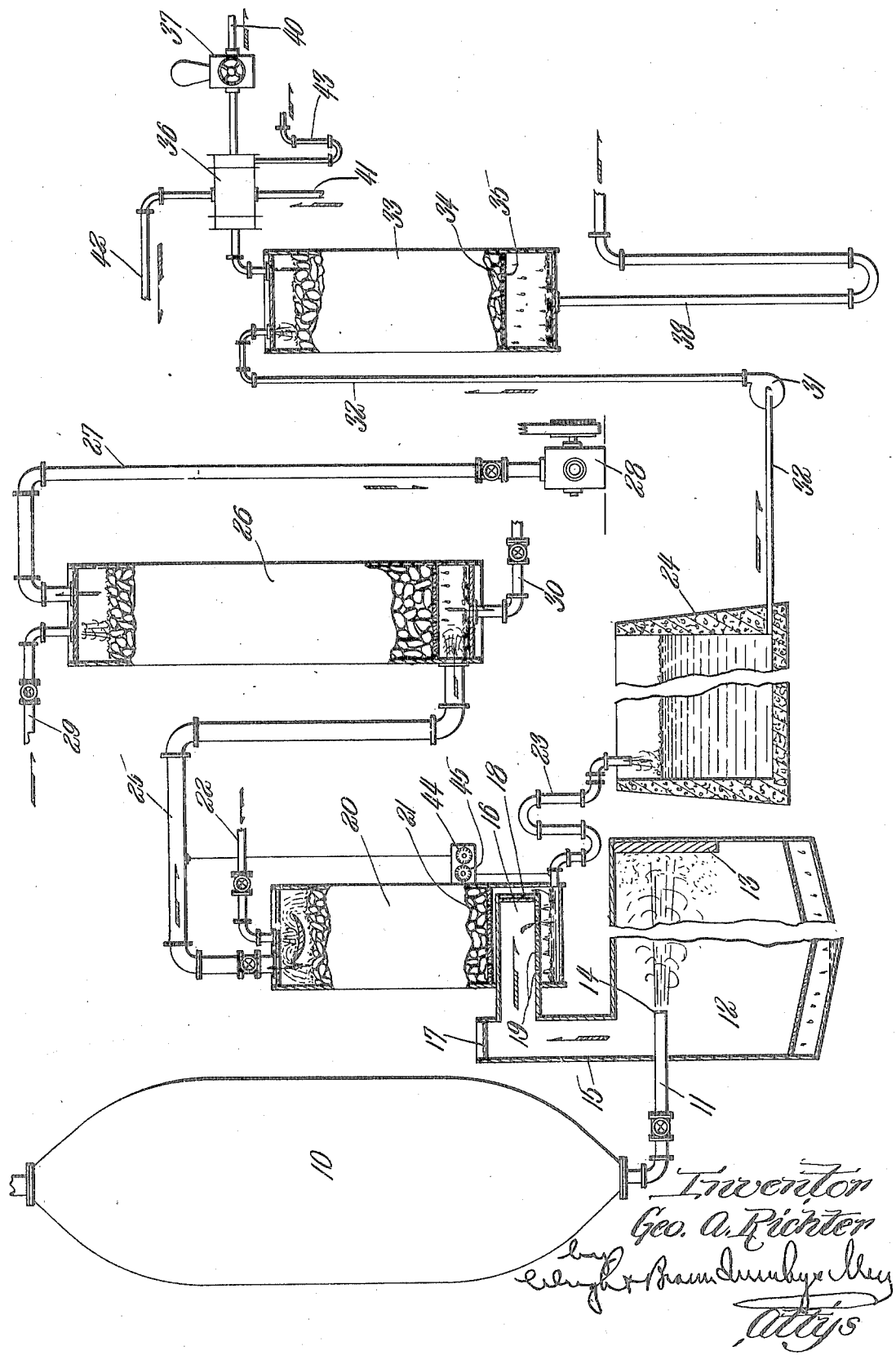

Patented Sept. 25, 1928.

1,685,754

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

METHOD OF RECOVERING SULPHUR DIOXIDE FROM WASTE GASES.

Application filed July 14, 1923. Serial No. 651,591.

This invention relates to a method of and apparatus for recovering sulphur dioxide gas from the vapors and gases discharged from the blow-pit in the manufacture of cellulose pulp by the sulphite process, of the general character of those set forth and described in my application Serial No. 405,915, filed August 25, 1920.

On the accompanying drawing, the figure illustrates more or less conventionally and diagrammatically an apparatus embodying the invention and by which the improved process may be practiced.

On the drawing,—I have illustrated at 10 a digester of any type suitable for the digestion of cellulosic material with the usual cooking liquor containing more or less free sulphurous acid. The digester is connected by the usual pipe 11 with a blow-pit 12 having a target 13, against which the contents of the digester are discharged by the nozzle 14 on the end of the blow-pipe 11. In place of the usual vomit stack, there rises from the blow-pit a conduit of any suitable form but which in the present instance comprises a short vertical section 15 and a lateral or horizontal section 16. An elbow tube may be employed for the purpose. As illustrated, the construction provides for a removable closure 17 at the upper end of the upright section 15. All of the vapors and gases, liberated in the blow-pit when the contents of the digester are discharged thereinto, pass through the conduit and are liberated into a direct condenser tower 20. The end of the horizontal section is closed by a suitable removable closure 18, and the lower part of the horizontal section is provided with numerous ports, slits or apertures 19 for the downward emission of vapors and gases. The horizontal section of the conduit extends laterally into the lower end of the condenser tower 20, which may be made of any suitable material and which is located in a plane above the blow-pit. The tower contains a transverse perforated partition 21, upon which is supported a mass of inert intersticial material such as rocks, but preferably of spiral bricks, so-called, which provide numerous interrupted tortuous passages for the counter-current flow of water and the vapors and gases which are delivered from the blow-pit. Water at seasonable temperature is sprayed downwardly on to the mass of the inert intersticial material, being supplied through a valved pipe 22 from any suitable source.

In my said copending application hereinbefore referred to, the water delivered from the condenser tower 20 is discharged into the blow-pit, but, as this has the effect of greatly increasing the water delivered to the blow-pit, and as it is under certain circumstances desirable not to increase the volume of waste liquor, particularly when the waste liquor is subsequently to be evaporated and concentrated for the recovery of its valuable contents, I provide a trapped eduction pipe 23 leading from the lower end of the tower to a large tank 24.

A large gas conduit 25 leads from the top of the direct condenser tower 20 so as to deliver the chilled gases for recovery of the $SO_2$. I have shown this conduit as delivering the gases to the lower end of an absorption tower 26 containing limestone or dolomite; but, if desired, this tower may contain inert intersticial material such as spiral brick or inert rock. A gas conduit 27 leads from the top of the tower 26 to a suction or vacuum pump 28 so as to create and maintain a vacuum in the system as far back as the condenser tower 20, and so as to draw from the absorption or reclaiming tower 26 the inert gases which pass upwardly through the reclaiming tower.

The vapors and gases rising from the blow-pit pass upwardly through the condenser tower 20 in counter-current flow to the cooling water which is discharged into the upper end of the tower, as a result of which the aqueous vapors are condensed and the gases are cooled as they pass upwardly through the intersticial material in contact with the water, and the said gases are delivered to the lower end of the reclaiming or recovery tower 26. As the water passes downwardly through the condenser tower 20, it is gradually heated; and, although a portion of the $SO_2$, which is absorbed by the cooler water at the upper end of the tower is discharged as the water becomes heated in its passage downwardly through the tower, nevertheless the water passing the lower end of the tower contains an appreciable percentage of $SO_2$ gas. This acid liquor is discharged into the large tank 24. The water delivered to the recovery tower 26, either for the absorption of the $SO_2$ gas or for the formation of calcium bisulphite liquor, in the event that the intersticial material consists of limestone, dolomite or the like, is conducted to the top of the tower from a suitable source by a water valved pipe indicated at 29. The liquor, passing from the lower end of the tower, is conducted by a valved pipe 30 to a suitable receptacle for further use.

As previously stated, the liquor contained in the large tank 24 is acid, and it is one of the objects of the present invention to recover the $SO_2$ therefrom. This is accomplished in the present instance by pumping the acid liquor by means of a pump 31 through a pipe 32 to the top of the tower 33 containing a mass 34 of inert intersticial material such as fragments of rock, spiral brick or the like, supported by a perforated partition 35. Connected with the top of this tower there is an indirect condenser 36 and a vacuum pump 37, and, leading from the bottom of the tower, there is a trapped pipe 38, the trap of which is twenty feet or more in height. This pipe may lead to any suitable receptacle from which the waste water may be drawn for use as wash water or otherwise. As the acid liquor from the tank 24 passes downwardly through the tower 33, where it is divided into numerous small streams, having a relatively large aggregate surface, it is subjected to vacuum, the effect of which is to remove nearly all of the $SO_2$ from such liquor. As this gas passes through the condenser 36, it is chilled for the condensation of any entrained moisture and a substantially dry cool gas is delivered through the outlet 40 from the vacuum pump 37 and may be conducted to any suitable point for the making of acid cooking liquor. It may, for example, be delivered to the lower end of tower 26. The water is supplied to the indirect condenser 36 by a pipe 41 and the heated water is conducted away by a pipe 42. The condensate from the gases passing through the condenser is discharged through a trapped pipe 43, and, as it contains some $SO_2$, is preferably delivered to some part of the acid system.

It will be understood that a single blow-pit and condensing and recovery system may serve for a bank of digesters, or that each digester may have a separate blow-pit and its associate condenser. A recording thermometer 44 is connected to the conduit 25 at a point near the tower 20, and a like recording thermometer 45 is connected to the outlet pipe 23 leading from the tower 20.

The process is as follows: When the contents of the digester, i. e. spruce chips, have been cooked under suitable conditions of temperature, pressure and time in the acid cooking liquor, i. e. calcium bisulphite with free sulphurous acid, until the cellulose fibers are freed to be separated from the lignin or cementitious content of the wood, the vacuum pumps 28 and 37 are set in operation, and the blow-pit is flushed with steam from any suitable source to exclude free oxygen as far as possible. Water is delivered to the top of the direct condenser tower through the pipe 22 to cause a downward flow of multitudinous small streams of cold water through the intersticial or surface material in the tower 20, and water is caused to flow through the tower 26. The contents of the digester are blown into the blow-pit, and the gases and vapors rising through the conduits 15, 16 emerge therefrom into the tower 20 and are drawn upwardly into contact with the downwardly flowing streams of colder water. During the counter-current flow of the water and of the gases and vapors, the vapors are condensed by the water, the flow of water through the condenser tower being carefully controlled by adjustment of the valve in the pipe 22 so that the outgoing gas from the tower is maintained, preferably below 100° F., and the outgoing water through the pipe 23 is kept preferably above 180° F., so as to prevent, so far as it is possible, its carrying with it excessive quantities of absorbed $SO_2$. This outgoing acid liquor, however, is discharged into the tank 24, from which it is withdrawn by the pump 31 and delivered to the top of the tower 23. As this liquor passes through the last-mentioned tower, it is subjected to a vacuum for removal of the absorbed or contained $SO_2$, the latter being delivered from the tower through the condenser to the vacuum pump. This gas, as previously stated, may now be used in the formation of cooking acid. Preferably the flow of water through the absorption tower 26 is so regulated that a fairly strong acid liquor is produced containing from 3% to 5% sulphurous acid.

What I claim is:—

1. A process which comprises discharging the hot digested contents of a sulphite digester into a blowpit, passing the hot sulphur dioxide and vapors liberated in the blowpit in direct contact with and in counter-flow to cold water supplied in amount so that the largest fraction of sulphur dioxide is cooled without being absorbed and passes on in a cooled condition for absorption while a substantial recoverable fraction is absorbed and remains in solution in the resulting hot effluent water; and recovering the sulphur dioxide from the hot effluent water.

2. A process which comprises discharging the hot digested contents of a sulphite digester into a blowpit, passing the hot sulphur dioxide and vapors liberated in the blowpit in direct contact with and in countercurrent flow to cold water through a tower filled with inert interstitial material, the water being regulated in amount so that the largest fraction of sulphur dioxide is cooled without being absorbed and passes on in a cooled condition for absorption, while a substantial recoverable fraction is absorbed and remains in solution in the resulting hot effluent water, passing the hot effluent water from said tower through a confined mass of inert interstitial material while subjecting the same to a vacuum, thereby liberating the sulphur dioxide content thereof; and recovering the liberated sulphur dioxide.

In testimony whereof I have affixed my signature.

GEORGE A. RICHTER.